Jan. 22, 1946.  E. M. S. McWHIRTER ET AL  2,393,331
GENERATOR OF ELECTRIC OSCILLATIONS
Filed March 24, 1943  2 Sheets-Sheet 1

Inventors
Eric McWhirter
Roland Harris...
By George J. Hyde
Attorney

Patented Jan. 22, 1946

2,393,331

UNITED STATES PATENT OFFICE 2,393,331

GENERATOR OF ELECTRIC OSCILLATIONS

Eric Malcolm Swift McWhirter and Roland Harris Dunn, London W. C. 2, England, assignors to Standard Telephones and Cables Limited, London, England, a company of Great Britain Application March 24, 1943, Serial No. 480,314
In Great Britain May 29, 1942

5 Claims. (Cl. 250—36)

The present invention relates to thermionic valve oscillation generators, and particularly to multi-phase high frequency oscillators.

For high frequency testing and other purposes a three-phase system of currents is sometimes required, and three-phase valve generators have been previously employed, but they have been found difficult to use and adjust at high frequencies because of the necessity for controlling those factors whose effects become appreciable at such frequencies. In the present invention, arrangements of the same general type are employed, but modifications are introduced whereby the above-mentioned factors may be better controlled.

A particular case in which a three phase high-frequency oscillator is of use, is in connection with protective arrangements for three-phase power lines for detecting and isolating faults. For this purpose it has been frequently the practice to make use of the unbalance in the phases of the power supply caused by faults to operate relay systems, but considerable difficulties are encountered in this method and it has been found much simpler and better to divide the line into short sections by filters or the like and to supply carrier currents separately to each section which currents will be subjected to the same fault conditions and can be adapted to isolate the faulty sections through suitable relays. For this purpose a three-phase high-frequency generator is needed. Such a generator would, however, be of quite general application.

The principles of the invention may also be extended to oscillators producing any desired odd number of phases.

According to the invention there is provided a multi-phase high-frequency oscillator comprising an odd number of similar thermionic valve amplifying stages arranged in tandem in a closed ring, and inter-connected in such a way that the output current of each stage is jointly controlled by the output voltages of two other stages.

The invention may also comprise a three-phase high-frequency oscillator comprising three similar thermionic valve amplifying stages interconnected in such a way that the output current of each stage is jointly controlled by the output voltages of the other two stages.

According to another aspect, the invention consists in a three-phase high-frequency oscillator comprising three thermionic valve amplifying stages each having one or more input control grids and an output plate, and means for placing the grid or grids of each stage under the control of the plate voltages of both the other stages so that the total output current of the said stage is in phase opposition to the vector sum of the said plate voltages, and proportional in magnitude thereto.

The invention will be more clearly understood by reference to the following detailed description of embodiments and to the accompanying drawings in which.

Figure 1:
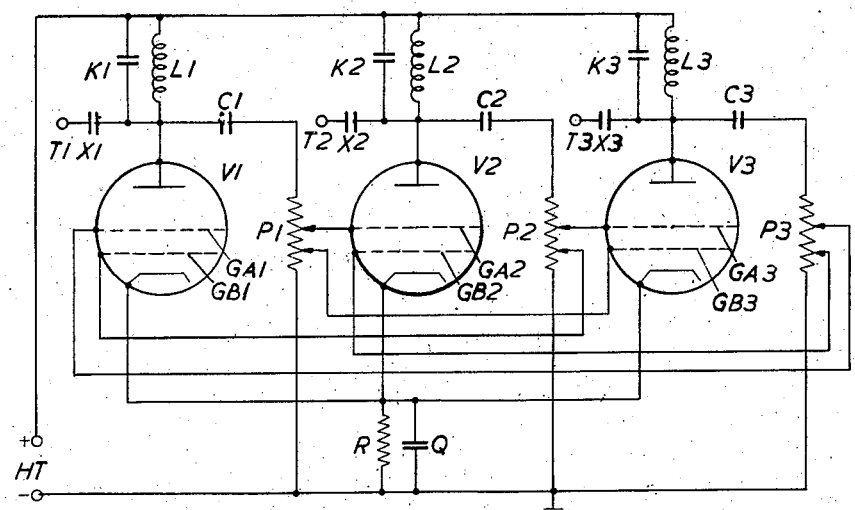
Fig. 1 shows a schematic circuit diagram of one embodiment of the invention.

The circuit of Fig. 1 shows one embodiment of the invention, and will be employed to explain the principles of this type of three-phase oscillator. It will be seen to consist of three thermionic valve amplifying stages connected cyclically in tandem so that the input circuit of each is connected to the output circuit of the previous stage in the cycle. The three stages consist of three valves $V_1$, $V_2$ and $V_3$ each having two control grids $GA_1$, $GB_1$; $GA_2$, $GB_2$; and $GA_3$, $GB_3$. The plates of the valves $V_1$, $V_2$ and $V_3$ are fed from the high tension supply through the anti-resonant circuits $L_1$ $K_1$, $L_2$ $K_2$ and $L_3$ $K_3$ respectively, and are coupled to the first grids $GA_2$, $GA_3$, $GA_1$ of the next following valves $V_2$ $V_3$ and $V_1$, respectively, through the condensers $C_1$, $C_2$ and $C_3$ and adjustable contacts on the potentiometers $P_1$, $P_2$ and $P_3$. The grids $GB_1$, $GB_2$ and $GB_3$ are connected respectively to adjustable contacts on $P_2$, $P_3$ and $P_1$. The three cathodes are connected to earth through a common biassing resistance R shunted by a by-pass condenser Q, or any other convenient biassing arrangement could be used instead. The three phases may be obtained respectively from the terminals $T_1$, $T_2$ and $T_3$ connected to the plates of the valves, through suitable blocking condensers $X_1$, $X_2$ and $X_3$.

The circuit of Fig. 1 differs from an already known arrangement principally in the introduction of the extra grids $GB_1$, $GB_2$, $GB_3$ and in their method of connection. Disregarding for the present these extra grids, the circuit may be regarded as consisting of a closed loop comprising three amplifying stages $V_1$, $V_2$ and $V_3$ coupled together cyclically by three similar transmission networks each of which consists of the elements C, P and L, K; and transmission round the loop is in the direction $V_1$—$V_2$—$V_3$—$V_1$. Now it is well known that the conditions for the generation of sustained oscillations in such a loop are that if the loop be imagined to be cut at any point, then a wave having the oscillating frequency transmitted into the loop at the forward side of the cut should arrive at the other side with no change in amplitude, and a phase change which is zero or an integral multiple of $2\pi$. The anti-resonant circuits L, K should be tuned to the desired oscillation frequency and the components L and K should preferably be chosen so that the resonant impedance is very high compared with that of the circuit C, P. The anti-resonant circuit will then have a negligible effect on the coupling transmission networks, which can thus be regarded as comprising only the elements C and P.

Let $f$ be the desired oscillation frequency and let $\omega = 2\pi f$. Let $-\mu_1$ be the amplification factor of the valves (assuming they are all similar), the minus sign being used to take account of the phase reversal in each valve. If $e$ be the alternating voltage applied to the grid $GA_1$ of $V_1$, the valve will operate as if there were an electromotive force $-\mu_1 e$ operating in series with the internal plate circuit resistance, which will be taken as $R_0$. The alternating output current will accordingly be $$I = \frac{-\mu_1 e}{R_0 + P - j/\omega C} = \frac{-\mu_1 e}{Z_0 \sqrt{\theta}} = \frac{\mu_1 e}{Z_0} \sqrt{\pi - \theta}$$

in which $$Z_0 = \sqrt{(R_0 + P)^2 + 1/\omega^2 C^2}$$

and $$\tan \theta = \frac{1}{\omega C (R_0 + P)}$$

If $$Z\sqrt{\theta} = P - j/\omega C$$

in which $$Z = \sqrt{P^2 + 1/\omega^2 C^2}$$

and $$\tan \theta = \frac{1}{\omega C P}$$

then the output voltage at terminal T is $$E_p = \frac{\mu_1 \, e \, Z}{Z_0} \sqrt{\pi - \theta + \phi}$$

The voltage applied to the grid $GA_2$ is $$E = \frac{\mu_1 a_1 P e}{Z_0} \sqrt{\pi - \theta}$$

in which $a_1$. P is the resistance of the potentiometer up to the sliding contact.

$$\frac{E}{e} = \frac{P \mu_1 a_1}{Z_0} \sqrt{\pi - \theta}$$

Assuming that the three stages are similar, it is evident that if the adjustments are made so that for each stage $$\frac{E}{e} = \frac{P \mu_1 a_1}{Z_0} \sqrt{\pi - \theta} = 1 . \sqrt{2\pi/3}$$

then the total phase change will be $2\pi$, and the amplitude will be the same after transmission round the loop, thus fulfilling the conditions quoted above. It follows, therefore, that the various quantities should be chosen so that $$\theta = \frac{\pi}{3}, \text{ so that } C = \frac{1}{3 . (R_0 + P)}$$

and $$\frac{P \mu_1 a_1}{Z_0} = 1, \text{ so that } \mu_1 a_1 = \frac{2 (R_0 + P)}{P}$$

The plate voltage $Ep_1$ of valve $V_1$ lags in phase behind the voltage of grid $GA_1$ by an angle $$\pi - \theta + \phi = \frac{2\pi}{3} + \phi$$

The voltage of $GA_2$ lags behind that of $$GA_1 \text{ by } \frac{2\pi}{3}$$

Figure 3:
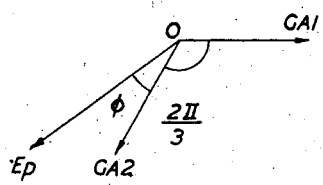
Figs. 3, 4 and 6 are explanatory vector diagrams.

Thus the plate voltage $Ep_1$ lags behind the voltage of $GA_2$ by the angle $\phi$. These relations are shown in the vector diagram Figure 3.

It will be obvious that since the phase change through each stage has been fixed at $$\frac{2\pi}{3}$$

the output voltages obtained at terminals $T_2$ and $T_3$ will differ by $$\frac{2\pi}{3} \text{ and } \frac{4\pi}{3}$$

respectively from the voltage at $T_1$, so that the desired three-phase output will be obtained.

The above considerations assume that there are no sources of phase change other than the networks C, P. Actually, of course, there will be various stray capacities associated with the valves, and elsewhere, which cannot be neglected, particularly at high frequencies. Thus, the formulae given above will enable approximate values of C and P to be calculated, but it is preferable for a small range of adjustment to be provided so that the proper conditions can be found by trial.

When, according to the present invention, the extra grids $GB_1$, $GB_2$ and $GB_3$ are included as shown in Figure 1, it will observed that effectively another oscillating loop has been set up, but in the opposite direction. Thus, for these grids, transmission round the loop is in the direction $V_1$—$V_3$—$V_2$—$V_1$. If $\mu_2$ be the amplification factor for the extra grids, and $a_2$ the factor corresponding to $a_1$ for these grids, it will be evident that the formulae derived above will apply to these grids by writing $\mu_2$ for $\mu_1$ and $a_2$ for $a_1$. The output voltage obtained at each terminal T will be the vector sum of the voltages due separately to the two grids of the corresponding valve. The voltages of these grids are themselves derived from the plate voltages of the other two valves, respectively.

Thus let $$E\angle 0$$

be the plate voltage of $V_2$ and let $$E\angle 2\pi/3$$

and $$E\angle\sqrt{2\pi/3}$$

be the plate voltages of $V_1$ and $V_3$ which is the arrangement desired for a three-phase output.

Then the voltage $e_a$ of $GA_2$ will be $$e_a = \frac{E\angle 2\pi/3 \, a_1 P}{Z\sqrt{\phi}}$$

and the voltage $e_b$ of $GB_2$ will be $$e_b = \frac{E\sqrt{2\pi/3} \, a_1 P}{Z\sqrt{\phi}}$$

Hence the plate voltage of $V_2$ will be $$E = -\frac{(\mu_1 . e_a + \mu_2 . e_b) Z \sqrt{\phi}}{Z_0 \sqrt{\theta}}$$

$$= -\frac{EP}{Z_0 \sqrt{\theta}} (\mu_1 a_1 \angle 2\pi/3 + \mu_2 a_2 \sqrt{2\pi/3})$$

If $a_1$ and $a_2$ be chosen so that $\mu_1 a_1 = \mu_2 a_2$ then $$E = \frac{E \mu_1 a_1 P}{Z_0 \sqrt{\theta}}$$

It is thus seen that for the oscillation conditions to be satisfied, $\theta$ must be substantially zero, or in other words C must be very large compared with $R_0 + P$. This condition is substantially fulfilled at high frequencies by using large blocking condensers for C, and the slight phase error remaining will be taken up in the tuning of the anti-resonant circuits. It will be seen that the circuit of the invention operates quite differently from the previously used circuit which has been described, because in that circuit the condenser C is an essential element in fixing the phase change produced by each stage whereas in the circuit of the invention, it only functions as a blocking condenser and must not operate to modify the phase appreciably.

Figure 4:
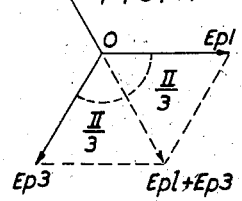

In the circuit of Figure 1, it can be seen by reference to Figure 4 that if the two grid voltages in each tube differ in phase by $2\pi/3$ their resultant will differ in phase from either by $\pi/3$; and as a result of the phase reversal through the valve the plate voltage will differ in phase from each of the grid voltages and therefore from each of the other plate voltages by $2\pi/3$. This however only holds if the condensers C are so large that the plate loads are all substantially pure resistances.

It will be clear that the frequency will be determined primarily by the L, K circuits, a slight adjustment being necessary to compensate for the effect of the C condensers and other stray capacities. It will clearly be necessary to adjust $a_1$ and $a_2$ for each valve so that the products $\mu_1 a_1$ and $\mu_2 a_2$ are all equal in all the valves, otherwise the output phases will be neither equal in amplitude nor equally spaced angularly. For this purpose a three-phase oscilloscope, such for example as is described in the specification of the co-pending application Serial No. 480,315, filed March 24, 1943 may be used, whereby simultaneous traces of the three phases may be obtained. The circuit is then adjusted until the desired conditions are obtained.

In the case where the two grids in each valve are similarly placed in the same plane so that $\mu_1 = \mu_2$, it will not be necessary to have two adjustments on the potentiometers P. The grids $GB_1$, $GB_2$ and $GB_3$ may then be directly connected to $GA_3$, $GA_1$ and $GA_2$ respectively. This simplifies the adjustment of the circuit.

If double grid valves having such similar grids are not available, an equivalent result may be obtained by using a pair of similar valves for each stage. This may be seen in Figure 2, which shows how the valve $V_2$ of Figure 1 may be replaced by two valves $VA_2$ and $VB_2$. Those elements which are the same in both figures have the same designations.

Figure 2:
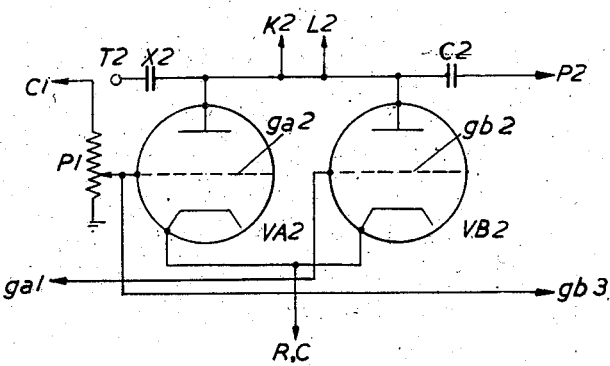
Figure 2 shows a modification of Figure 1.

The two valves in Figure 2 have their plates and cathodes connected in parallel to the same points respectively as the plate and cathode of $V_2$. The grid $ga_2$ is connected to the sliding contact $P_1$, and $gb_2$ to the sliding contact of $P_3$. The other two valves $V_1$ and $V_3$ are each replaced by a pair of valves in exactly the same way, the grids $ga_1$ and $gb_3$ (not shown) being connected respectively to $gb_2$ and $ga_2$ as indicated.

The arrangement of Figure 2 will produce substantially the same result as Figure 1 when the two grids in each valve are similarly placed, as explained.

It should be noted that the arrangement according to the invention shown in Figure 1 (or modified as shown in Figure 2) is easy to control because there is no frequency adjustment of the coupling networks. In the already known arrangement without the extra grids, described above, not only do the three anti-resonant circuits L, K have to be tuned to the desired frequency, but also, the values of C and P have to be adjusted so that the proper phase change is obtained. In the circuit of the invention the proper phase relations are brought about as a result of the joint control of each valve by the other two.

It will be appreciated from what has been said that the total plate current of each stage into the output load, which comprises substantially only the element P, is proportional to the vector sum of the plate voltages of the other two stages and is in opposite phase, always assuming that C is large enough to be neglected.

Figure 5:
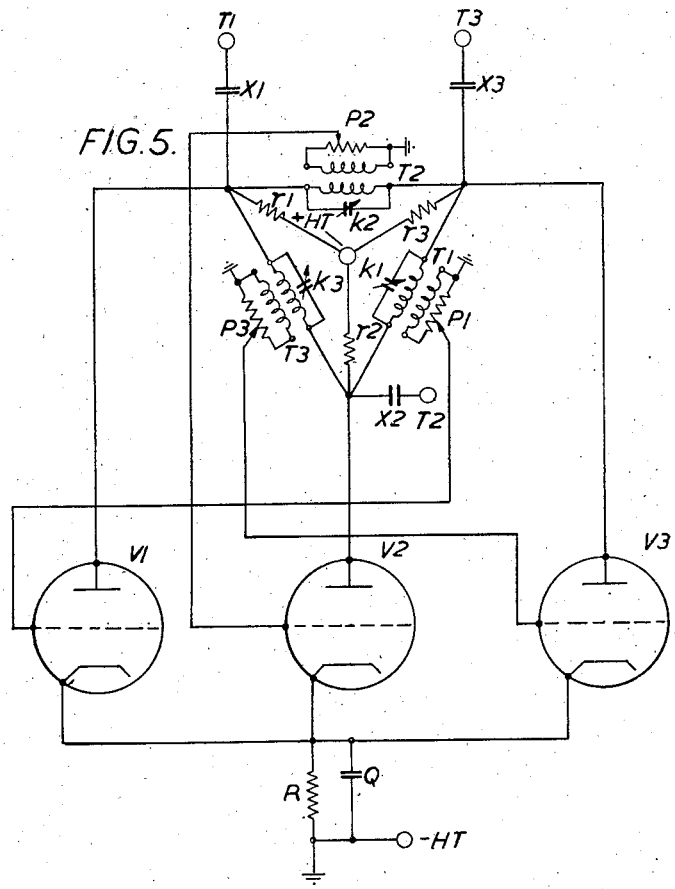
Fig. 5 shows a schematic circuit diagram of another embodiment.

Another embodiment of the invention is shown in Figure 5. Three similar transformers $T_1$, $T_2$ and $T_3$ have their primary windings connected in delta formation, the corners of the delta being connected respectively to the plates of three valves $V_1$, $V_2$ and $V_3$ as shown. The plates are fed from the positive terminal of the high tension supply through a star connected arrangement of three equal resistances $r_1$, $r_2$ and $r_3$. The transformers are respectively tuned to the desired frequency by means of the condensers $K_1$, $K_2$ and $K_3$ shunting the primary windings. The secondary windings are respectively connected to potentiometers $P_1$, $P_2$ and $P_3$, one end of each being connected to earth, and the sliding contacts are respectively connected to the grids of the valves $V_1$, $V_2$ and $V_3$. The cathodes of the valves are biassed in the usual way by means of the resistance R shunted by the by-pass condenser Q. If preferred, the secondary windings of the transformers could be tuned instead of the primary windings.

It will be noted that the transformer connections have been made in such a way that the voltage applied to the grid of each valve is derived from the combined plate voltages of the other two valves. At the resonance frequency, each transformer will present an impedance which is substantially a pure resistance, so that the voltage across each potentiometer will be proportional to the vector sum of the two corresponding plate voltages, and if the connection of the secondary windings be correctly poled, will be also in the same phase. Thus for each valve the voltage of the grid (which is connected to the sliding contact of the corresponding potentiometer) will be in phase with the vector sum of the plate voltages of the other two valves, and if these are equal in magnitude and differ in phase by $2\pi/3$, the plate voltage of that valve will differ in phase from either by $2\pi/3$ owing to the phase reversal in the valve, just as was explained above in connection with Figure 1.

In setting up the circuit of Figure 5 the three transformers are first tuned to the desired frequency, and the three potentiometers are then adjusted with the help of an oscilloscope until the three phases are obtained with equal amplitude and equally spaced in phase.

Figure 6:
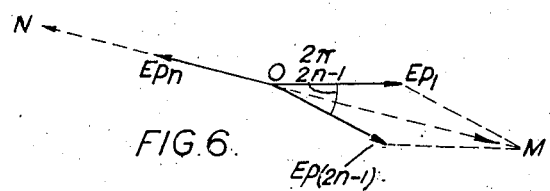

The principle of the invention may be extended to the design of an oscillator having any odd number of phases $(2n-1)$. In the case of Figure 1, $(2n-1)$ valves connected in tandem would be needed, with all the other elements similarly duplicated. In the vector diagram Figure 6 is shown the plate voltages $OEp_1$ and $OEp_{(2n-1)}$ for the first and last valves, which are two adjacent valves in the series. The angle between these vectors is $2\pi/(2n-1)$ and their resultant OM makes an angle $\pi/(2n-1)$ with either. The reversed resultant ON will be in the same phase as the desired plate voltage for the $n$th valve in the series. Thus if the grids of the $n$th valve (or pair of valves, (Fig. 2) be connected to the potentiometers $P_1$ and $P_{(2n-1)}$, the $n$th phase will be obtained from that valve. It will, however, clearly be necessary to adjust the two potentiometers so that the vector ON is reduced to the proper length $OEp_n$. Clearly the grids of each of the $(2n-1)$ valves may be connected to those two valves which are $(n-1)$ places away from it; when this is done the system will oscillate and $(2n-1)$ phases will be obtained from the plates of the $(2n-1)$ valves.

In Figure 5 the same result can be obtained from $(2n-1)$ valves, and $(2n-1)$ transformers arranged in a regular polygon. The grid of each valve is connected to the transformer joining the two valves $(n-1)$ places away from it, and the corresponding potentiometer P is adjusted to produce the proper plate voltages.

It will further be evident that the $n$th valve could be likewise controlled from the 2nd and $(2n-2)$th valves, or the 3rd and the $(2n-3)$th of the $r$th *and the* $(2n-r)$th valves, since in all these cases the reversed resultant will be in the desired direction. However, when $r$ gets near to $$\frac{n}{2}$$

the resultant may be too small in magnitude for oscillations to be possible. When $r$ is greater than $$\frac{n}{2}$$

the resultant changes sign and oscillations are then impossible in the circuit of Figure 1 unless phase reversing transformers or the like are added. In Figure 5, however, oscillations would be again obtainable simply by reversing one of the windings of each transformer.

In the circuits which have been described, the valves have been shown for clearness as triodes having indirectly heated cathodes, the heating circuits being conventional and therefore not shown. In many cases, particularly at high frequencies, screen grid valves or pentodes may be more suitable and the circuits described will be unaffected except for the addition of the polarising arrangements for the extra electrodes, which may be supplied in any known way. Directly heated filamentary cathodes could also be used with appropriate arrangements. It will be evident also that the circuits are capable of various modifications in other ways to suit particular cases, while retaining the features of the invention as described. For example, each valve might be replaced by an amplifying stage comprising two or more valves connected in tandem, so that the grid or grids of the first tandem connected valve and the plate of the last would correspond respectively to the grid or grids and to the plate of the valve so replaced; and attenuators could be used instead of the potentiometers.

What is claimed is:

1. A three-phase high-frequency oscillator comprising three thermionic valve amplifying stages each having two input control grids and an output plate, and means for placing one grid of each stage under the control of the plate voltage of one of the other stages and the second grid of the said stage under the control of the plate voltage of the second of the other stages so that the total output current of the said stage is in phase opposition to the vector sum of the said plate voltages, and proportional in magnitude thereto.

2. An oscillator according to claim 1 in which the output load is substantially a pure resistance.

3. An oscillator according to claim 1 in which each output load comprises a potentiometer having two adjustable contacts connected respectively to one of the grids of each of the other amplifying stages.

4. A multi-phase high frequency oscillator comprising an odd number of similar thermionic valve amplifying stages arranged in tandem in a closed ring each said valve having two control grids, said oscillator comprising $(2n-1)$ amplifying stages, means for applying the output voltage of one of the two adjacent stages to the control grid of that stage which is $(n-1)$ places from either round the ring, and means for applying the output voltage of the other one of said two adjacent stages to the other control grid of that stage which is $(n-1)$ places from either round the ring.

5. An oscillator according to claim 4 in which each stage comprises two input grids and an output plate, and means for applying the plate voltages of the corresponding two adjacent stages one to each of the grids in such manner that the said output current is in phase opposition to the vector sum of the said plate voltages and is proportional in magnitude thereto.

ERIC MALCOLM SWIFT McWHIRTER.
ROLAND HARRIS DUNN.